US008699813B2

(12) United States Patent
Singh et al.

(10) Patent No.: US 8,699,813 B2
(45) Date of Patent: Apr. 15, 2014

(54) ADAPTIVE FILTER FOR LOW-LIGHT NOISE REDUCTION

(75) Inventors: Raka Singh, Bangalore (IN); Gaurav Malik, Bangalore (IN); Rajesh Mahapatra, Bangalore (IN)

(73) Assignee: Analog Devices, Inc, Norwood, MA (US)

( * ) Notice: Subject to any disclaimer, the term of this patent is extended or adjusted under 35 U.S.C. 154(b) by 311 days.

(21) Appl. No.: 12/950,666

(22) Filed: Nov. 19, 2010

(65) Prior Publication Data

US 2012/0127370 A1 May 24, 2012

(51) Int. Cl.
G06K 9/40 (2006.01)

(52) U.S. Cl.
USPC .......................... 382/260; 382/256; 382/266

(58) Field of Classification Search
USPC ........................................................ 382/261
See application file for complete search history.

(56) References Cited

U.S. PATENT DOCUMENTS

| | | | | |
|---|---|---|---|---|
| 5,257,182 A * | 10/1993 | Luck et al. | | 382/224 |
| 5,331,442 A | 7/1994 | Sorimachi | | |
| 5,561,723 A | 10/1996 | DesJardins et al. | | |
| 5,661,823 A | 8/1997 | Yamauchi et al. | | |
| 5,717,781 A * | 2/1998 | Ebel et al. | | 382/141 |
| 5,740,268 A * | 4/1998 | Nishikawa et al. | | 382/132 |
| 5,767,922 A * | 6/1998 | Zabih et al. | | 348/700 |
| 5,768,440 A | 6/1998 | Campanelli et al. | | |
| 5,793,885 A | 8/1998 | Kasson | | |
| 5,959,693 A | 9/1999 | Wu et al. | | |
| 6,167,164 A | 12/2000 | Lee | | |
| 6,229,578 B1 | 5/2001 | Acharya et al. | | |
| 6,272,253 B1 * | 8/2001 | Bannon et al. | | 382/236 |
| 6,272,497 B1 | 8/2001 | Mendenall et al. | | |
| 6,389,176 B1 * | 5/2002 | Hsu et al. | | 382/254 |
| 6,608,910 B1 * | 8/2003 | Srinivasa et al. | | 382/100 |
| 6,614,474 B1 * | 9/2003 | Malkin et al. | | 348/252 |
| 6,668,097 B1 * | 12/2003 | Hu et al. | | 382/275 |
| 6,721,458 B1 | 4/2004 | Ancin | | |
| 6,798,910 B1 | 9/2004 | Wilson | | |
| 6,928,196 B1 * | 8/2005 | Bradley et al. | | 382/300 |
| 6,965,395 B1 | 11/2005 | Neter | | |
| 7,142,729 B2 | 11/2006 | Wredenhagen et al. | | |
| 7,151,863 B1 * | 12/2006 | Bradley et al. | | 382/299 |
| 7,155,058 B2 | 12/2006 | Gaubatz et al. | | |
| 7,167,595 B2 | 1/2007 | Hiroshige et al. | | |
| 7,313,288 B2 | 12/2007 | Dierickx | | |
| 7,397,964 B2 | 7/2008 | Brunner et al. | | |

(Continued)

FOREIGN PATENT DOCUMENTS

| | | |
|---|---|---|
| EP | 1150248 | 10/2001 |
| WO | WO-2005065115 | 7/2005 |

OTHER PUBLICATIONS

International Search Report and Written Opinion mailed on Jun. 11, 2012 for International application No. PCT/US2011/060756 (15 pgs).

(Continued)

Primary Examiner — Manav Seth
(74) Attorney, Agent, or Firm — Patent Capital Group

(57) ABSTRACT

In general, in one embodiment, low-light noise is removed from an image by separately filtering luma and chroma components of the image, by adaptively filtering the image based at least in part on a Gaussian distribution of the image, and/or by dividing the image into separate regions and filtering each region separately.

25 Claims, 7 Drawing Sheets

(56) References Cited

U.S. PATENT DOCUMENTS

| | | | |
|---|---|---|---|
| 7,471,320 B2 | 12/2008 | Malkin | |
| 7,532,767 B2 * | 5/2009 | Oztan et al. | 382/268 |
| 7,627,192 B2 | 12/2009 | Yokochi | |
| 7,724,307 B2 | 5/2010 | Wan et al. | |
| 7,783,117 B2 * | 8/2010 | Liu et al. | 382/232 |
| 7,860,337 B2 | 12/2010 | Zimmer | |
| 7,868,950 B1 | 1/2011 | Samadani et al. | |
| 8,131,117 B2 * | 3/2012 | Wei et al. | 382/300 |
| 8,149,336 B2 | 4/2012 | Mohanty et al. | |
| 8,189,943 B2 * | 5/2012 | Yea et al. | 382/257 |
| 8,290,061 B2 | 10/2012 | Sang et al. | |
| 8,355,175 B2 * | 1/2013 | Noguchi | 358/2.1 |
| 8,457,433 B2 | 6/2013 | Hong | |
| 8,488,031 B2 | 7/2013 | Schwartz et al. | |
| 2002/0159650 A1 | 10/2002 | Hiroshige et al. | |
| 2003/0007099 A1 * | 1/2003 | Zhang et al. | 348/607 |
| 2003/0048951 A1 | 3/2003 | Rengakuji et al. | |
| 2003/0185463 A1 | 10/2003 | Wredenhagen et al. | |
| 2003/0190092 A1 | 10/2003 | Dyas et al. | |
| 2005/0276505 A1 | 12/2005 | Raveendran | |
| 2006/0110062 A1 | 5/2006 | Chiang et al. | |
| 2006/0146193 A1 | 7/2006 | Weerasinghe et al. | |
| 2007/0091187 A1 | 4/2007 | Lin | |
| 2007/0217701 A1 * | 9/2007 | Liu et al. | 382/234 |
| 2008/0088719 A1 | 4/2008 | Jacob | |
| 2008/0123979 A1 | 5/2008 | Schoner | |
| 2008/0205786 A1 | 8/2008 | Young | |
| 2008/0239153 A1 | 10/2008 | Chiu | |
| 2008/0240602 A1 | 10/2008 | Adams | |
| 2008/0317377 A1 | 12/2008 | Saigo et al. | |
| 2009/0010546 A1 * | 1/2009 | Rossato et al. | 382/199 |
| 2009/0033773 A1 | 2/2009 | Kinoshita | |
| 2009/0129695 A1 | 5/2009 | Aldrich | |
| 2009/0147111 A1 | 6/2009 | Litvinov | |
| 2009/0154800 A1 | 6/2009 | Kojima et al. | |
| 2009/0175535 A1 | 7/2009 | Mattox | |
| 2009/0208106 A1 | 8/2009 | Dunlop et al. | |
| 2009/0219379 A1 * | 9/2009 | Rossato et al. | 348/14.01 |
| 2009/0278961 A1 | 11/2009 | Mohanty et al. | |
| 2009/0290809 A1 * | 11/2009 | Yamada | 382/266 |
| 2010/0020208 A1 | 1/2010 | Barbu | |
| 2010/0142843 A1 | 6/2010 | Chen | |
| 2010/0182968 A1 | 7/2010 | Ojala et al. | |
| 2011/0090351 A1 | 4/2011 | Cote et al. | |
| 2012/0127370 A1 | 5/2012 | Singh et al. | |
| 2012/0128243 A1 | 5/2012 | Singh et al. | |
| 2012/0128244 A1 | 5/2012 | Singh et al. | |

OTHER PUBLICATIONS

Kinabalu, Kota, "Impulse Detection Adaptive Fuzzy (IDAF) Filter," http://www.computer.org/portal/web/scdl/doi/10.1109/ICCTD.2009.157.

Justin Reschke, "Parallel Computing", Sep. 14, 2004, http://www.cs.ucf.edu/courses/cot4810/fall04/presentations/Parallel_Computing.ppt, pp. 1-28.

Blaise, Barney, "Introduction to Parallel Computing", May 27, 2010, http://web.archive.org/web/20100527181410/http://computing.llnl.gov/tutorials/parallel_comp/, pp. 1-34.

"Introduction to Parallel Programming", Jun. 27, 2010, http://web.archive.org/web20100627070018/http://static.msi.umn.edu/tutorial/scicomp/general/ intro_parallel_prog/content.html, pp. 1-12.

"Introduction to Parallel Programming Concepts", date unknown, http://rcc.its.psu/education/workshops/pages/parwork/introctiontoParallelProgrammingConcepts. pdf, pp. 1-124.

* cited by examiner

ADAPTIVE FILTER FOR LOW-LIGHT NOISE REDUCTION

TECHNICAL FIELD

Embodiments of the invention generally relate to video signal processing, and in particular to processing video signals to remove artifacts caused by low-light noise.

BACKGROUND

Low-light images are especially susceptible to corruption from noise caused by light-detecting sensors (i.e., low-light artifacts). For example, a video or still camera may capture undesirable grains or discolorations in low-light conditions. This noise may lead to uncorrelated pixels and, as a result, reduced compression efficiency for video coding algorithms (e.g., MPEG4 and H.264). Many applications, such as security cameras, capture low-light images and require a large amount of storage space for retaining those images, and any decrease in the required storage space may lead to a more cost-effective application, an increase in the number of images or frames of video stored, or reduced network traffic for transporting the images. Thus, efforts have been made to detect and eliminate low-light noise.

Previous efforts (such as transform-domain methods, DCT, wavelet, or other statistical methods), however, suffer from drawbacks. These methods are computationally intensive and require a significant amount of computing resources, which may not be available on low-power, portable, or other devices. Furthermore, these methods are not adjustable based on available resources or the complexity of the source image, further wasting resources on simple images or during high-load conditions in which the additional resources may not be necessary or available.

SUMMARY

In general, various aspects of the systems and methods described herein use a Gaussian distribution and correlation technique to remove uncorrelated low-light noise from images taken from video or still cameras. The images may be split into luma and chroma components and filtered separately. Different filters may be used depending on the complexity of the images and the resources available. The filters may adapt to variations in the image by using edge-detection and dilation filters, thereby preserving high-frequency details at feature edges. Furthermore, the image may be divided into a plurality of sections, filtered separately, and re-combined.

In general, in one aspect, an adaptive filter for filtering noise from a low-light image includes a morphology filter and a comparative filter. The morphology filter divides the image into a non-edge region and a dilated edge region by dilating an edge detected in the image. The comparative filter compares a pixel in the non-edge region to a region surrounding the pixel and optionally replaces the pixel, based on a result of the comparison, with a new pixel derived at least in part from the region surrounding the pixel.

In various embodiments, a difference filter detects the edge in the image and/or the morphology filter comprises a dilation filter. The dilation filter may be a 3×4 dilation filter, and the region surrounding the pixel may correspond to a 3×3 pixel region. The adaptive filter may compare a difference between the pixel and a mean of the region surrounding the pixel to a variance of the region surrounding the pixel. The variance may be a variance of a Gaussian distribution of the region surrounding the pixel; a circuit may be included to compute the variance of the Gaussian distribution of the region surrounding the pixel. The mean may be a mean of a Gaussian distribution of the region surrounding the pixel; a circuit may be included to compute the mean of the Gaussian distribution of the region surrounding the pixel.

The comparative filter may derive the new pixel based at least in part on a median value of the region surrounding the pixel and/or a low-pass filter value of the region surrounding the pixel. The comparative filter may replace a second pixel adjacent to the pixel with the new pixel; the pixel may be an even pixel and the second pixel may be an odd pixel. Alternatively, the comparative filter may preserve the pixel.

In general, in another aspect, a method for adaptively filtering noise from a low-light image includes dilating an edge detected in an image to divide the image into a non-edge region and a dilated edge region. A pixel in the non-edge region is compared to a region surrounding the pixel. The pixel is optionally replaced, based on a result of the comparison, with a new pixel derived at least in part from the region surrounding the pixel.

In various embodiments, the edge may be detected in the image. Comparing the pixel to the region surrounding the pixel may include comparing a difference between the pixel and a variance of the region surrounding the pixel to a mean of the region surrounding the pixel. The variance may be a variance of a Gaussian distribution of the region surrounding the pixel, and the mean may be a mean of a Gaussian distribution of the region surrounding the pixel. The new pixel may be derived based at least in part on a median value of the region surrounding the pixel and/or a low-pass filter value of the region surrounding the pixel. A second pixel, adjacent to the pixel, may be replaced with the new pixel; the pixel may be an even pixel and the second pixel may be an odd pixel. Alternatively, the comparative filter may preserve the pixel.

These and other objects, along with advantages and features of the present invention herein disclosed, will become more apparent through reference to the following description, the accompanying drawings, and the claims. Furthermore, it is to be understood that the features of the various embodiments described herein are not mutually exclusive and may exist in various combinations and permutations.

BRIEF DESCRIPTION OF THE DRAWINGS

In the drawings, like reference characters generally refer to the same parts throughout the different views. In the following description, various embodiments of the present invention are described with reference to the following drawings, in which.

DETAILED DESCRIPTION

Figure 1:
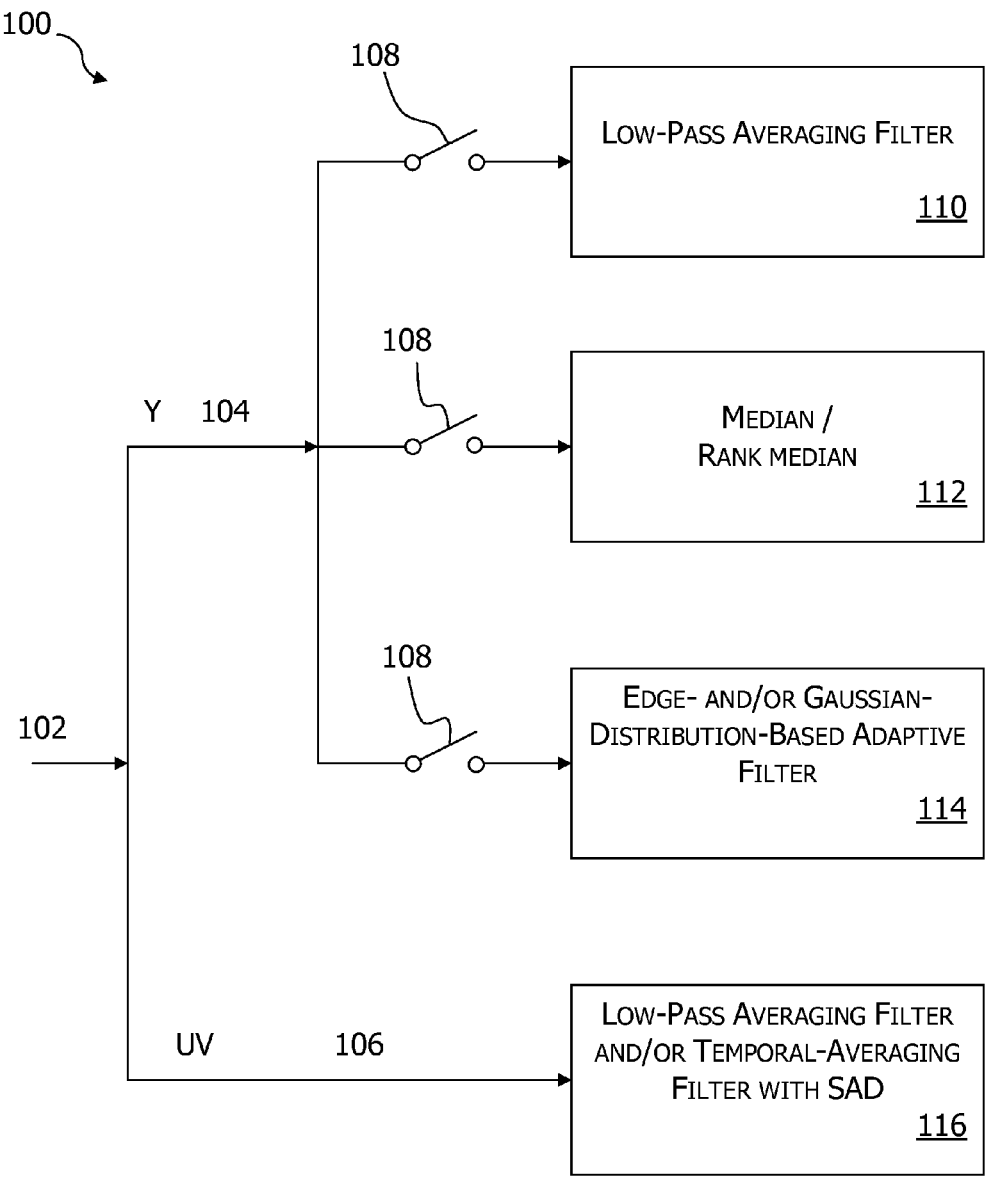
FIG. 1 is a block diagram of a system for removing noise from a low-light image in accordance with an embodiment of the invention.

FIG. 1 illustrates a system 100 for removing noise from a low-light image. As one of skill in the art will understand, a source image 102 may be separated into a brightness component 104 and a color component 106. The brightness component 104 may also be known as a Y or luma component; the color component 106 may also be known as a UV or chroma component. In one embodiment, the brightness component 104 and color component 106 are filtered separately using different filters. Once the brightness component 104 and color component 106 are filtered, they may be combined to re-create a filtered version of the original image 102 or further processed as separate components.

A network of switches 108 selects one of three filters 110, 112, 114 for the brightness component 104 of the image 102. The system 100 may include any number of brightness-component filters, however, including a single filter, and the current invention is not limited to any particular number or type of filter. In one embodiment, a low-pass averaging filter 110 may be selected by the switches 108 if the source image 102 is simple, if only a small degree of filtering is required, and/or if system resources are limited. The low-pass averaging filter 110 attenuates high-frequency signals in the brightness component 104, while allowing low-frequency signals to pass. In one embodiment, the low-pass averaging filter 110 performs a blur function on the brightness component 104.

A median filter 112 may be used to filter the brightness component 104 for images of medium complexity, if a medium amount of filtering is desired, and/or if an average amount of system resources is available. As one of skill in the art will understand, the median filter 112 processes the brightness component 104 pixel by pixel and replaces each pixel with the median of it and surrounding pixels. For example, the median filter 112 may consider a 3×3 window of pixels surrounding a pixel of interest (i.e., nine total pixels). The median filter 112 sorts the nine pixels by their brightness values, selects the value in the middle (i.e., fifth) position, and replaces the pixel of interest with the selected value. In one embodiment, the filter 112 is a rank or rank-median filter, and may select a pixel in any position in the sorted list of pixels (e.g., the third or sixth position). In one embodiment, if the absolute difference between the selected value and the original value is larger than the threshold, the original value is kept; if the difference is smaller than or equal to the threshold, the ranked value is assigned.

An adaptive filter 114 may be used to filter the brightness component 104 for images of high complexity, if a large amount of filtering is desired, and/or if a large amount of system resources is available. The adaptive filter 114 selects a filtering technique based on the dynamically determined characteristics of the brightness component 104, as explained in greater detail below.

A low-pass averaging filter 116 (e.g., a 5×5 low-pass averaging filter) may be used to filter the color component 106. In one embodiment, the color component 106 is less complex than the brightness component and/or is less affected by low-light noise and thus requires less filtering. The filter 116 may be a temporal-averaging filter with sum-of-absolute-differences or any other type of similar filter. The system 100 may include more than one color-component filter 116, and one of the plurality of color-component filters 116 may be selected based on the complexity of the color component 106, the availability of system resources, and/or a desired level of filtering quality.

Figure 2:
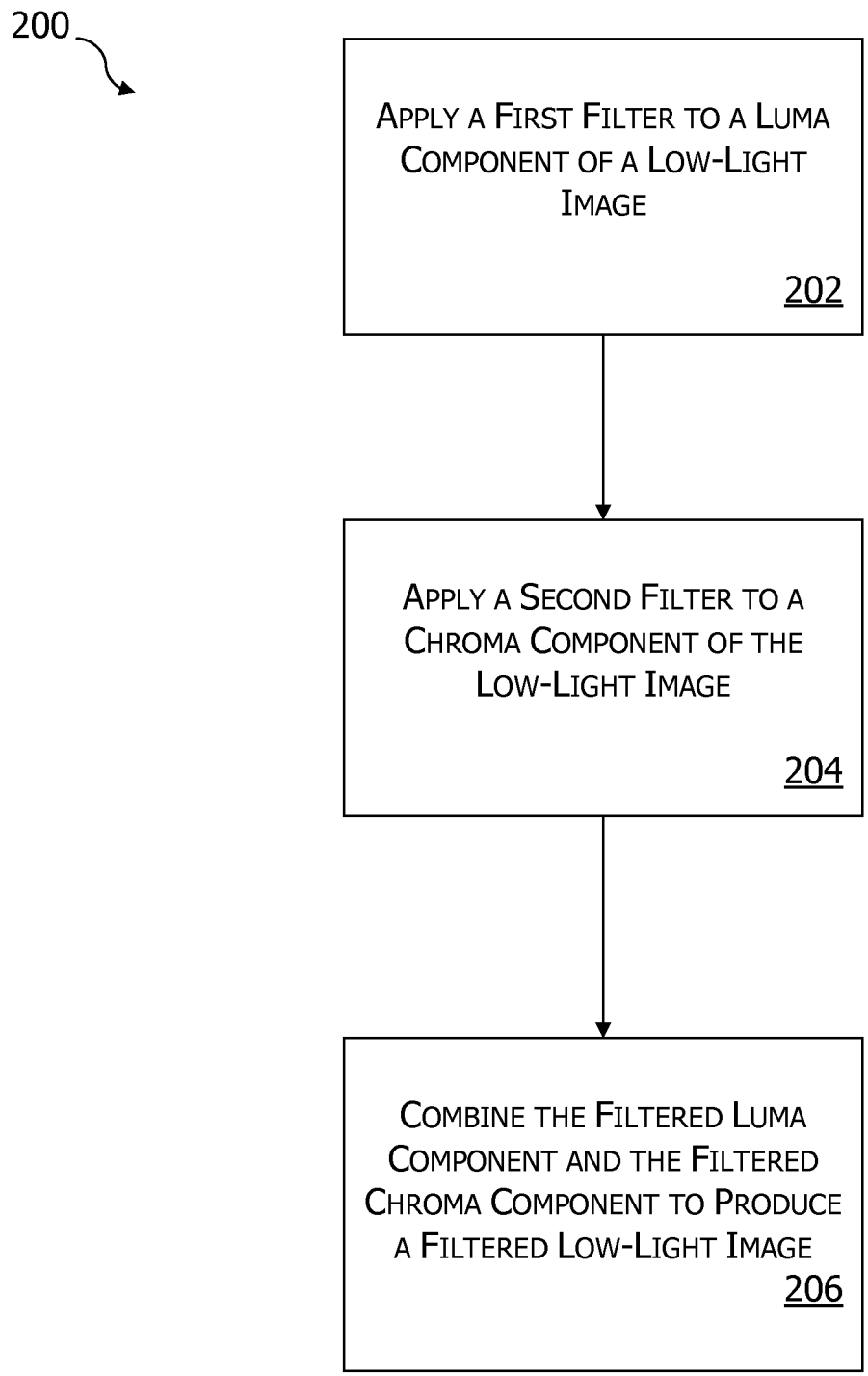
FIG. 2 is a flowchart illustrating a method for removing noise from a low-light image in accordance with an embodiment of the invention.

FIG. 2 illustrates a flowchart 200 for removing noise from a low-light image. A first filter is applied to a luma component of a low-light image (Step 202) and a second filter is applied to a chroma component of the low-light image (Step 204). The filtered luma component is combined with the filtered chroma component to produce a filtered low-light image (Step 206). The first filter may be the low-pass averaging filter 110, median/rank-median filter 112, or the edge/Gaussian-distribution-based adaptive filter 114, as described above, and the second filter may be the low-pass or temporal-averaging filter 116.

Figure 3:
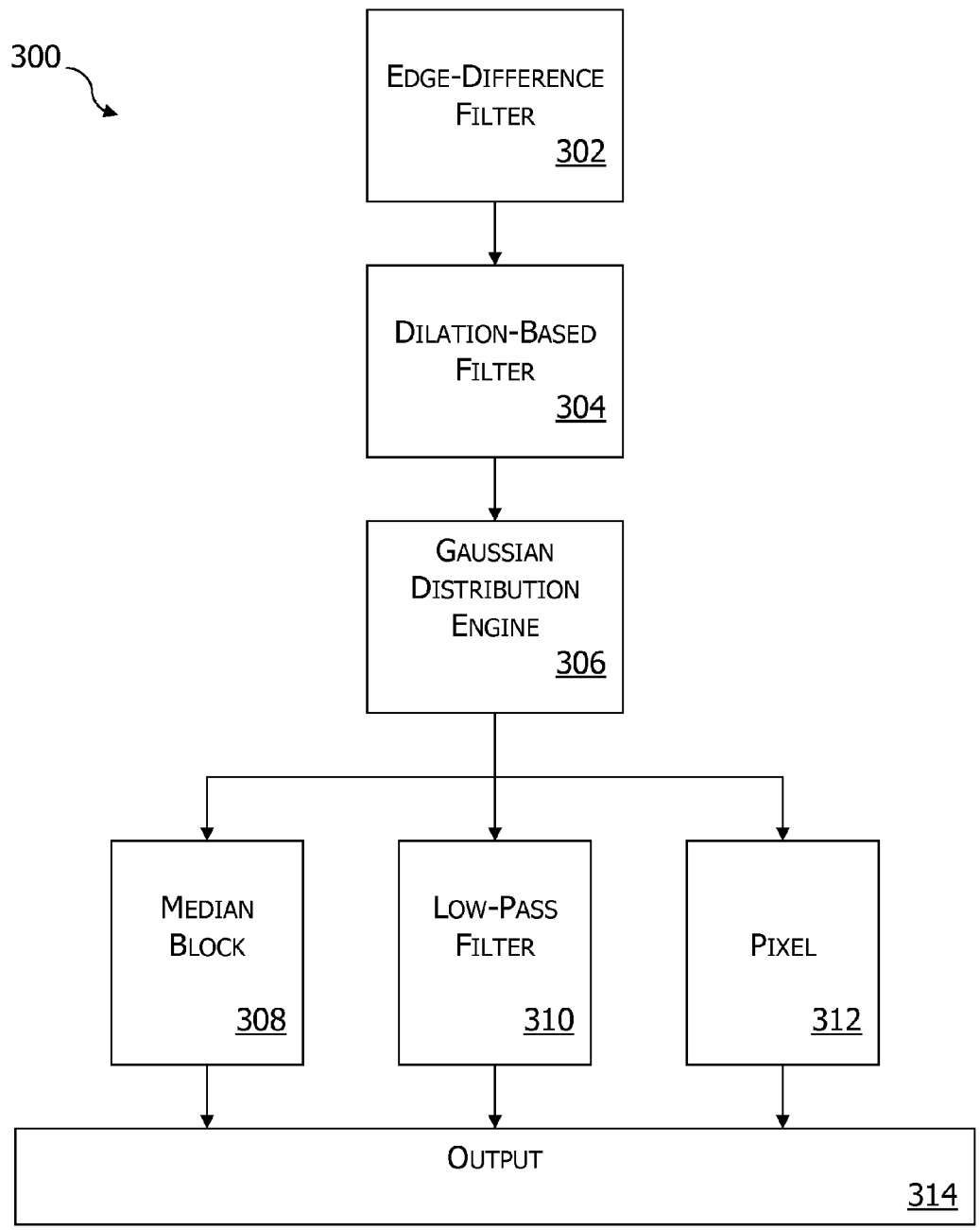
FIG. 3 is a block diagram of an adaptive filter in accordance with an embodiment of the invention.

FIG. 3 is an illustration of one implementation 300 of the adaptive filter 114. An edge-difference filter 302 detects edges in a luma component 104 of an image 102. The edge-difference filter 302 may also be known as a difference filter. The edge-difference filter 302 may detect edges in the luma component 104 while retaining high-frequency details therein. The edge-detection process divides the pixels in the luma component into edge and non-edge pixels.

A dilation-based filter 304 modifies the output of the edge-difference filter 302 by distributing the results of the edge detection to neighboring pixels. The dilation-based filter may be modified to ease implementation on, for example, embedded and/or DSP platforms. For example, if four pixels in a row are dilated, the four pixels may be shifted, depending on the pixel location, to align with a word boundary. In various embodiments, the dilation-based filter 304 is a morphology filter, a 3×4 dilation filter, or a 4×3 dilation filter. The dilation-based filter 304 may expand, or dilate, regions of pixels designated as edge pixels to incorporate other, nearby pixels. For example, a pixel having an intensity different from its neighbors may be the result of low-light noise; but, if the location of the pixel is near a detected edge, the pixel may instead be the result of a real physical feature of the captured image. The dilation-based filter 304, by correlating such pixels occurring near detected edges to edge pixels, prevents their erroneous designation as noise-produced pixels.

Each non-edge pixel in the dilated luma component 104 is then analyzed against a neighboring region of pixels (e.g., a neighboring 3×3 block of pixels). Depending on the differences between the analyzed pixel and its neighbors, as computed by a Gaussian distribution engine 306, the pixel is assigned a new value according to assignment units 308-312 and output by an output unit 314.

In greater detail, the Gaussian distribution engine 306 computes a mean and a variance of the Gaussian distribution of the block or window surrounding the analyzed pixel. The deviation of the pixel from the mean of the block is computed and compared with the variance. If the difference between the pixel and the variance is much greater than the mean (e.g., greater than three times the standard deviation), the pixel is likely the result of low-light noise. In this case, the median block 308 replaces the pixel with the median of the block of pixels. If the difference between the pixel and the variance is near the mean, the low-pass filter 310 replaces the analyzed pixel with the result of low-pass filtering the block of pixels. If the difference between the pixel and the variance is less than the mean, the pixel block 213 passes the analyzed pixel to the output block 314 unchanged.

In general, the algorithm utilized by the assignment units 308-312 may be generalized by the following equations:

If {(Analyzed Pixel)−(Mean of Block of Pixels)}>$N$× (Variance of Block of Pixels): Output=Median of Block of Pixels     (1)

If {(Analyzed Pixel)−(Mean of Block of Pixels)}>M×
(Variance of Block of Pixels): Output=Result of
Low-Pass Filter of Block of Pixels        (2)

If {(Analyzed Pixel)−(Mean of Block of Pixels)}>P×
(Variance of Block of Pixels): Output=Original
Analyzed Pixel                            (3)

wherein $P \leq M \leq N$. That is, the output 314 is assigned the median 308 for large differences, the low-pass filter 310 for medium differences, and the original pixel 312 for small differences. In one embodiment, the operations performed by the above equations (1)-(3) are executed by specially allocated hardware. In another embodiment, the median operation is performed by the median filter 112 and low-pass filtering is performed by the low-pass averaging filter 110, as shown in FIG. 1.

Figure 4:
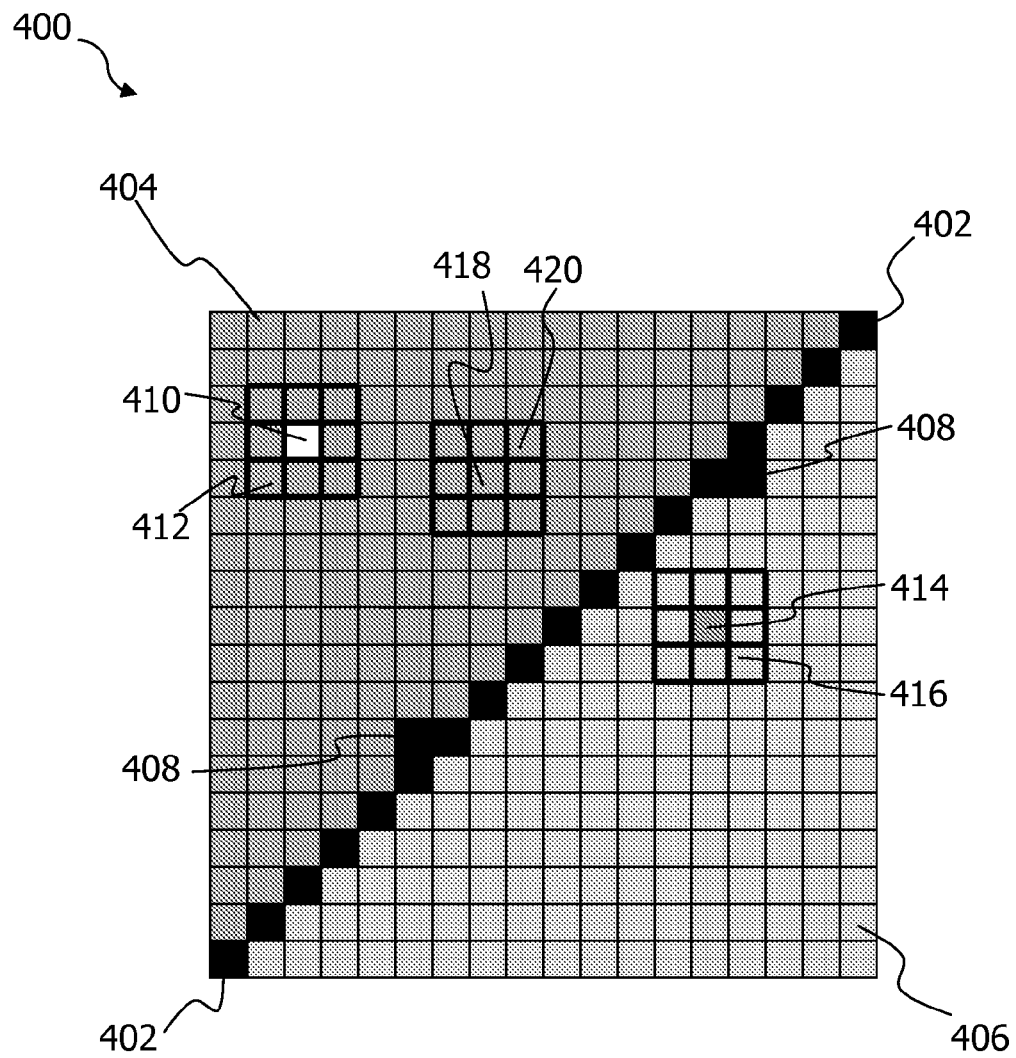
FIG. 4 is an example of a low-light image component in accordance with an embodiment of the invention.

FIG. 4 illustrates an example luma component 400. An edge 402 is detected between image regions 404 and 406. As described above, pixels 408 near the edge 402 may be designated as edge pixels by the dilation-based filter 304. A first pixel 410 may be analyzed and compared to its 3×3 surrounding pixels 412. In this case, because the difference between the analyzed pixel 410 and the mean of the block of pixels 412 is much greater (i.e., greater than a threshold N) than the variance of the block of pixels 412 (i.e., there is a large discrepancy between the luma value of the pixel 410 and its neighbors 412), the pixel 410 is replaced with the median of the 3×3 surrounding pixels 412.

In another example, another pixel 414 is analyzed and compared to its surrounding pixels 416. Here, because the difference between the analyzed pixel 414 and the mean of the block of pixels 412 is less than the first threshold N but greater than a second threshold M when compared to the variance of the block of pixels 412, the pixel 414 is replaced with the result of low-pass filtering the block 416. Finally, because the difference between a third analyzed pixel 418 and the mean of its surrounding block of pixels 420 is much less than a threshold P when compared to the variance of the block of pixels 420, the pixel 418 remains unchanged.

In one embodiment, the above-described system 300 analyzes every pixel in the luma component 104. In other embodiments, the system 300 analyzes only a subset of the total pixels in the luma component 104. For example, the system 300 may analyze only even-numbered pixels (e.g., every second pixel) in the luma component 104. The result of analyzing an even-numbered pixel may be applied not only to that pixel itself, but also to a neighboring odd-numbered pixel (e.g., a pixel adjacent to the analyzed even-numbered pixel in the same row). Because the two pixels are neighbors, the result computed for one pixel is likely to be similar to the uncomputed result of the neighboring pixel, and applying the analyzed pixel's result to both pixels may produce only a small error. Other subsets of pixels may be chosen for analysis, such as odd pixels, every Nth pixel, diagonal pixels, or rows/columns of pixels. The analyzed pixels may constitute 50% of the total pixels, as in the example above, or any other percentage of total pixels.

Figure 5:
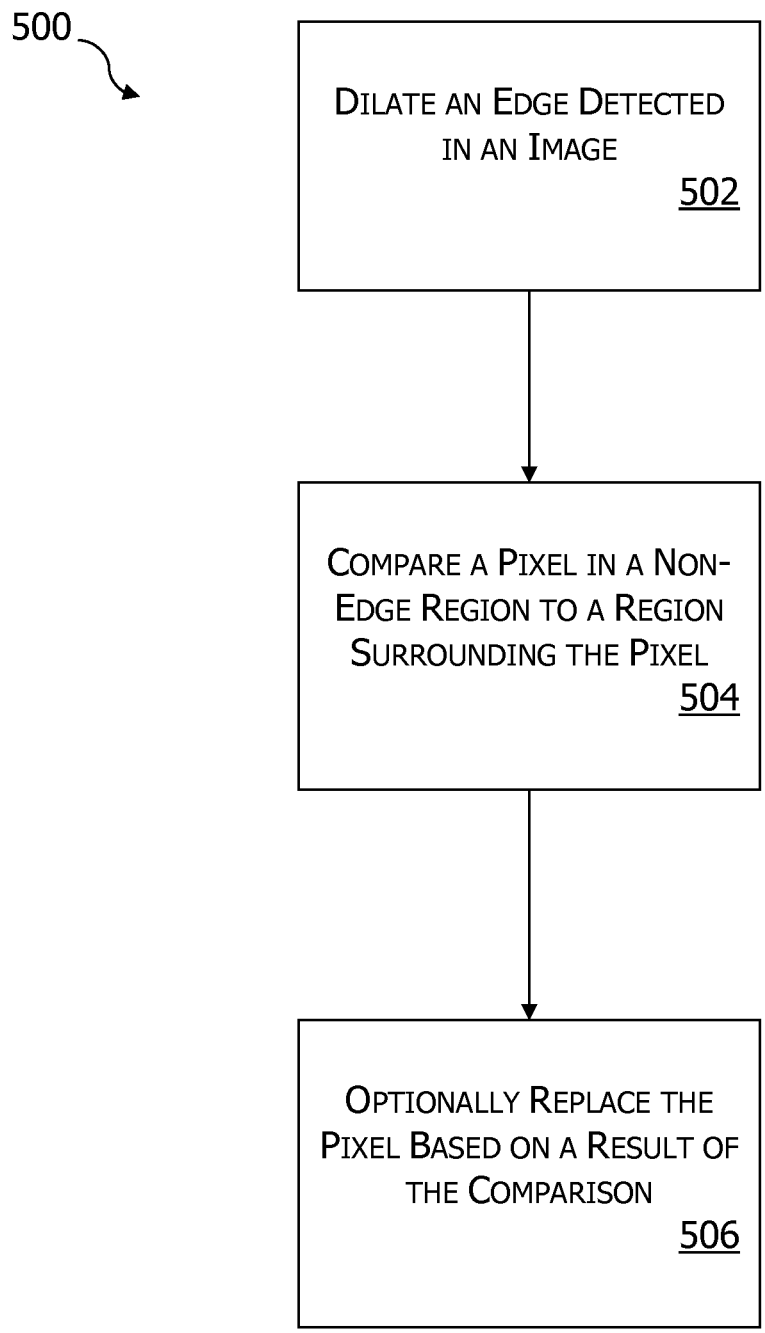
FIG. 5 is a flowchart illustrating a method for adaptively filtering noise from a low-light image in accordance with an embodiment of the invention.

FIG. 5 is a flowchart 500 illustrating a method for adaptively filtering noise from a low-light image. An edge detected in the image is dilated (Step 502) using, e.g., the edge-difference filter 302 and dilation-based filter 304 described above. The edge-detection and dilation divides the image into edge and non-edge pixels, and pixels in the non-edge region are compared to regions surrounding the pixels (Step 504). Depending on the result of the comparison, as described above, the non-edge pixels are optionally replaced (Step 506).

Figure 6:
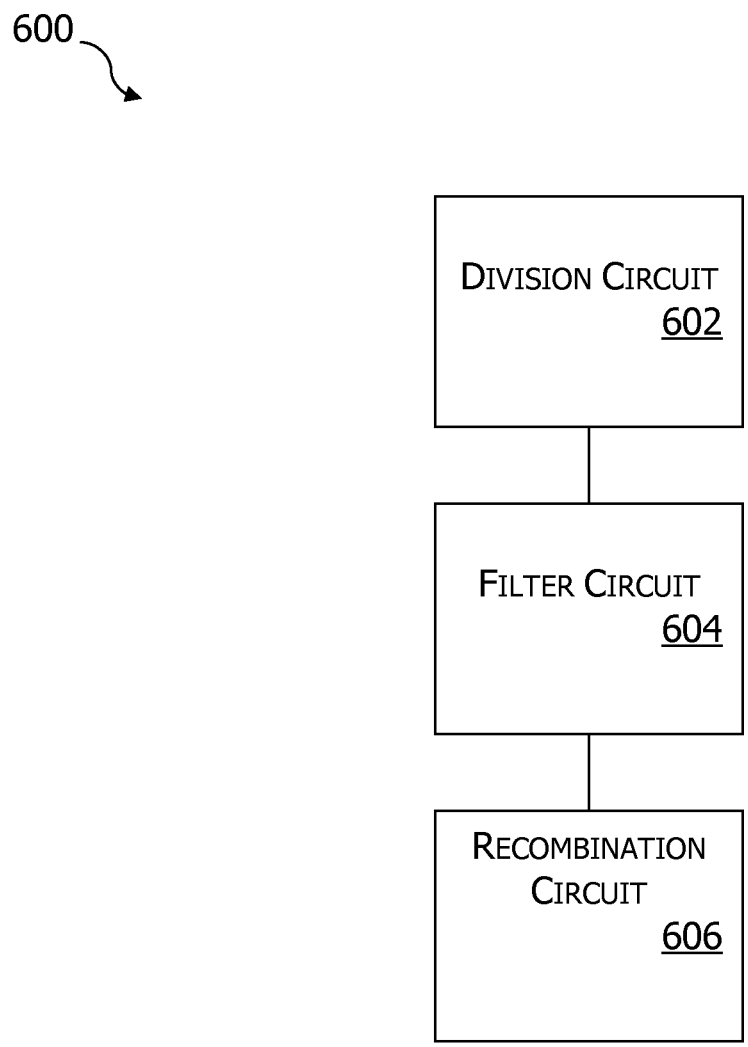
FIG. 6 is a block diagram of a system for dividing an image to remove low-light noise therefrom in accordance with an embodiment of the invention.

FIG. 6 is a block diagram 600 of a system for removing noise from a low-light image by dividing the image into sub-regions. A division circuit 602 divides the image into two or more regions, and a filter circuit 604 applies a first filter to luma components of each of the regions. Once each region has been filtered, a recombination circuit 606 combines each filtered region to create a filtered image. In general, the regions may be any M×N size, for example, 16×16 pixels.

In one embodiment, the system 600 may be used to divide an image into a number of regions that corresponds to a number of available filter circuits 604. Each filter circuit 604 may include a system 100, as illustrated in FIG. 1, for removing low-light noise from each region. The filter circuit 604 may include a first filter for filtering a luma component and a second filter for filtering a chroma component. The plurality of regions may then be filtered simultaneously in parallel, thereby reducing the time required to filter the entire image. In other embodiments, the number of regions is greater than the number of filter circuits 604, and some regions are processed in parallel while others are queued.

In another embodiment, only one filter circuit 604 is used to process each image region in series. In this embodiment, the size of the image region may be defined by an amount of memory or other storage space available and/or the capabilities of the filter circuit 604. The size of the region may be adjusted to consume more or fewer resources, depending on the constraints of a particular application. For example, an application having very limited memory may require a small region. History information for rows and columns of the regions or image may be stored and managed to ease data movement when switching and/or combining image regions.

Figure 7:
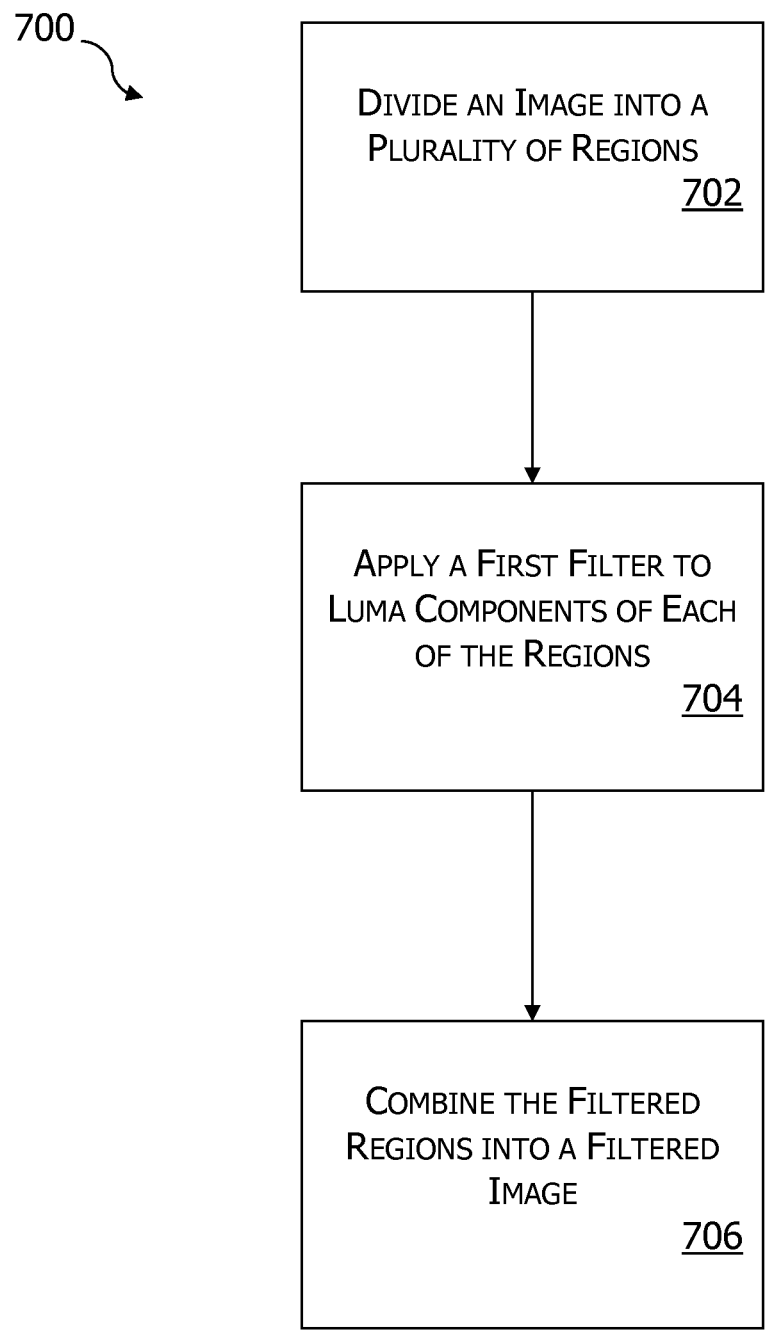
FIG. 7 is a flowchart illustrating a method for dividing an image to remove low-light noise therefrom in accordance with an embodiment of the invention.

FIG. 7 illustrates a method 700 for removing noise from a low-light image by dividing the image into sub-regions. The image is divided into a plurality of regions (Step 702), and a first filter is applied (in series or in parallel) to luma components of each of the regions (Step 704). The separately filtered regions are combined into a filtered image (Step 706).

Applying the first filter may include low-pass filtering the region, median filtering the region, and/or adaptively filtering the region, as described above with reference to FIG. 1. The adaptive filter compares a pixel in the region to neighboring pixels and optionally replaces it. As also described above, a chroma component of the image may also be broken down into image regions by the division circuit 602, filtered with a second filter, and re-combined by the recombination circuit 606. The sizes of the image regions of the chroma component may be the same as or different from the sizes of the image regions of the luma component. In one embodiment, the chroma component is processed as an entire image, due to its having less complexity, while the luma component is divided and processed separately.

Embodiments of the present invention may be provided as hardware, software, and/or firmware. For example, the systems 100, 300, 600 may be implemented on an embedded device, such as an ASIC, FPGA, microcontroller, or other similar device, and included in a video or still camera. In other embodiments, elements of the systems 100, 300, 600 may be implemented in software and included on a desktop, notebook, netbook, or handheld computer. In these embodiments, a webcam, cellular-phone camera, or other similar device may capture images or video, and the systems 100, 300, 600 may remove low-light noise therefrom. The present invention may further be provided as one or more computer-readable programs embodied on or in one or more articles of manufacture. The article of manufacture may be any suitable hardware apparatus, such as, for example, a floppy disk, a hard disk, a CD ROM disk, DVD ROM disk, a Blu-Ray disk, a flash memory card, a PROM, a RAM, a ROM, or a magnetic tape. In general, the computer-readable programs may be implemented in any programming language. Some examples of languages that may be used include C, C++, or JAVA. The software programs may be further translated into machine language or virtual machine instructions and stored in a program file in that form. The program file may then be stored on or in one or more of the articles of manufacture.

Certain embodiments of the present invention were described above. It is, however, expressly noted that the present invention is not limited to those embodiments, but rather the intention is that additions and modifications to what was expressly described herein are also included within the scope of the invention. Moreover, it is to be understood that the features of the various embodiments described herein were not mutually exclusive and can exist in various combinations and permutations, even if such combinations or permutations were not made express herein, without departing from the spirit and scope of the invention. In fact, variations, modifications, and other implementations of what was described herein will occur to those of ordinary skill in the art without departing from the spirit and the scope of the invention. As such, the invention is not to be defined only by the preceding illustrative description.

What is claimed is:

1. An adaptive filter for filtering noise from a low-light image, the adaptive filter comprising:
    a digital-signal processor configured for executing instructions, said instructions comprising:
    (i) a morphology filter for dilating edge pixels corresponding to an edge detected in the image, thereby dividing pixels in the image into non-edge pixels and dilated edge pixels; and
    (ii) a comparative filter for comparing a pixel in the non-edge region to a region surrounding the pixel and optionally replacing the pixel, based on a result of the comparison, with a new pixel derived at least in part from the region surrounding the pixel.

2. The adaptive filter of claim 1, further comprising a difference filter for detecting the edge in the image.

3. The adaptive filter of claim 1, wherein the morphology filter comprises a dilation filter.

4. The adaptive filter of claim 3, wherein the dilation filter is a 3×4 dilation filter.

5. The adaptive filter of claim 1, wherein the region surrounding the pixel corresponds to a 3×3 pixel region.

6. The adaptive filter of claim 1, wherein the adaptive filter compares a difference between the pixel and a mean of the region surrounding the pixel to a variance of the region surrounding the pixel.

7. The adaptive filter of claim 6, wherein the variance is a variance of a Gaussian distribution of the region surrounding the pixel.

8. The adaptive filter of claim 7, further comprising a circuit for computing the variance of the Gaussian distribution of the region surrounding the pixel.

9. The adaptive filter of claim 6, wherein the mean is a mean of a Gaussian distribution of the region surrounding the pixel.

10. The adaptive filter of claim 7, further comprising a circuit for computing the mean of the Gaussian distribution of the region surrounding the pixel.

11. The adaptive filter of claim 1, wherein the comparative filter derives the new pixel based at least in part on a median value of the region surrounding the pixel.

12. The adaptive filter of claim 1, wherein the comparative filter derives the new pixel based at least in part on a low-pass filter value of the region surrounding the pixel.

13. The adaptive filter of claim 1, wherein the comparative filter replaces a second pixel adjacent to the pixel with the new pixel.

14. The adaptive filter of claim 13, wherein the pixel is an even pixel and the second pixel is an odd pixel.

15. The adaptive filter of claim 1, wherein the comparative filter preserves the pixel.

16. A method for adaptively filtering noise from a low-light image, the method comprising:
    dilating edge pixels corresponding to an edge detected in an image to divide the image into a non-edge pixels and dilated edge pixels;
    comparing a pixel in the non-edge pixels to a region surrounding the pixel; and
    optionally replacing the pixel, based on a result of the comparison, with a new pixel derived at least in part from the region surrounding the pixel.

17. The method of claim 16, further comprising detecting the edge in the image.

18. The method of claim 16, wherein comparing the pixel to the region surrounding the pixel comprises comparing a difference between the pixel and a variance of the region surrounding the pixel to a mean of the region surrounding the pixel.

19. The method of claim 18, wherein the variance is a variance of a Gaussian distribution of the region surrounding the pixel.

20. The method of claim 18, wherein the mean is a mean of a Gaussian distribution of the region surrounding the pixel.

21. The method of claim 16, wherein the new pixel is derived based at least in part on a median value of the region surrounding the pixel.

22. The method of claim 16, wherein the new pixel is derived based at least in part on a low-pass filter value of the region surrounding the pixel.

23. The method of claim 16, further comprising replacing a second pixel with the new pixel, the second pixel being adjacent to the pixel.

24. The method of claim 23, wherein the pixel is an even pixel and the second pixel is an odd pixel.

25. The method of claim 16, wherein the comparative filter preserves the pixel.

* * * * *